US012576826B2

(12) United States Patent
Brok et al.

(10) Patent No.: US 12,576,826 B2
(45) Date of Patent: Mar. 17, 2026

(54) BRAKING SYSTEM FOR AN AUTONOMOUS VEHICLE

(71) Applicant: AUDI AG, Ingolstadt (DE)

(72) Inventors: Tobias Brok, Kösching (DE); Simone Macorig, Oelde (DE)

(73) Assignee: AUDI AG, Ingolstadt (DE)

( * ) Notice: Subject to any disclaimer, the term of this patent is extended or adjusted under 35 U.S.C. 154(b) by 1001 days.

(21) Appl. No.: 17/673,849

(22) Filed: Feb. 17, 2022

(65) Prior Publication Data

US 2022/0314953 A1 Oct. 6, 2022

(30) Foreign Application Priority Data

Apr. 6, 2021 (DE) .......................... 102021108524.1

(51) Int. Cl.
*B60T 13/74* (2006.01)
*B60T 7/04* (2006.01)
(Continued)

(52) U.S. Cl.
CPC .............. *B60T 17/22* (2013.01); *B60T 7/042* (2013.01); *B60T 7/22* (2013.01); *B60T 13/662* (2013.01);
(Continued)

(58) Field of Classification Search
CPC ................. B60T 13/741; B60T 13/745; B60T 2270/402; B60T 2270/413; B60T 7/12
See application file for complete search history.

(56) References Cited

U.S. PATENT DOCUMENTS 6,299,261 B1 * 10/2001 Weiberle ................. B60T 13/74
303/122.04
11,608,043 B2 * 3/2023 Ohkubo ................ F16D 55/226
(Continued)

FOREIGN PATENT DOCUMENTS

CN        108116392 A      6/2018
CN        112188976 A      1/2021
(Continued)

OTHER PUBLICATIONS

Examination Report issued on Jul. 1, 2024, in corresponding European Application No. 22 155 029.6, 10 pages.
(Continued)

*Primary Examiner* — Bradley T King
(74) *Attorney, Agent, or Firm* — Maier & Maier, PLLC

(57) ABSTRACT
A braking system in an at least partially autonomous vehicle, having one vehicle wheel brake per vehicle wheel, which is assigned to both the primary brake regulation system and a redundant secondary brake regulation system, wherein the primary brake regulation system has a primary control unit and one electromechanical primary actuator per vehicle wheel for actuating the vehicle wheel brake, and wherein the primary control unit generates primary positioning signals for activating the respective electromechanical primary actuator on the basis of a setpoint deceleration specification generated in a pilot system and/or a setpoint deceleration specification generated on the part of the driver by a brake pedal. The secondary brake regulation system has a secondary control unit independent of the primary control unit and one electromechanical secondary actuator, independent of the primary actuator, per vehicle wheel.

14 Claims, 1 Drawing Sheet

(51) Int. Cl.
*B60T 7/22* (2006.01)
*B60T 13/66* (2006.01)
*B60T 13/68* (2006.01)
*B60T 17/22* (2006.01)

(52) U.S. Cl.
CPC .......... *B60T 13/665* (2013.01); *B60T 13/686* (2013.01); *B60T 13/745* (2013.01); *B60T 13/741* (2013.01); *B60T 2270/402* (2013.01)

(56) References Cited

U.S. PATENT DOCUMENTS

| | | | | |
|---|---|---|---|---|
| 11,648,917 | B2 * | 5/2023 | Satoh | B60T 13/74 188/72.1 |
| 12,090,973 | B2 * | 9/2024 | Witte | B60T 17/221 |
| 12,097,838 | B2 * | 9/2024 | Brok | B60T 13/588 |
| 12,109,991 | B2 * | 10/2024 | Feigel | B60T 13/662 |
| 12,168,431 | B2 * | 12/2024 | Brenn | B60T 17/221 |
| 12,195,017 | B2 * | 1/2025 | Chen | B60R 16/03 |
| 2008/0296106 | A1 * | 12/2008 | Nilsson | B60T 8/345 701/115 |
| 2009/0223752 | A1 | 9/2009 | Kim | |
| 2010/0113215 | A1 * | 5/2010 | Jager | B60T 8/17616 477/29 |
| 2010/0198475 | A1 * | 8/2010 | Stolzl | B60W 30/18127 303/3 |
| 2013/0282249 | A1 * | 10/2013 | Heise | B60T 13/746 701/70 |
| 2016/0325719 | A1 * | 11/2016 | Linhoff | B60T 8/4872 |
| 2018/0215368 | A1 * | 8/2018 | Isono | B60T 13/741 |
| 2019/0176789 | A1 * | 6/2019 | Frenzel | B60T 13/745 |
| 2019/0248354 | A1 * | 8/2019 | Andrea | B60T 13/741 |
| 2019/0344769 | A1 * | 11/2019 | Zimmermann | B60T 8/326 |
| 2021/0179045 | A1 * | 6/2021 | Diehl | B60T 8/885 |
| 2021/0261103 | A1 * | 8/2021 | Baerhle-Miller | B60T 8/171 |
| 2021/0339723 | A1 * | 11/2021 | Funai | B60T 8/96 |
| 2022/0041058 | A1 * | 2/2022 | Nemeth | B60W 10/20 |
| 2022/0169222 | A1 * | 6/2022 | Ullrich | B60Q 9/00 |
| 2022/0194339 | A1 * | 6/2022 | Tarandek | B60T 13/745 |
| 2022/0212639 | A1 * | 7/2022 | Takahashi | B60T 13/686 |
| 2022/0227340 | A1 * | 7/2022 | Kim | B60T 7/042 |
| 2022/0314950 | A1 * | 10/2022 | Nilsson | B60T 13/746 |
| 2022/0324425 | A1 * | 10/2022 | Kim | B60T 8/885 |
| 2022/0371561 | A1 * | 11/2022 | Brenn | B60T 17/221 |
| 2022/0396251 | A1 * | 12/2022 | Nomura | B60T 17/22 |
| 2023/0278535 | A1 * | 9/2023 | Marx | B60T 7/107 188/106 P |
| 2023/0391302 | A1 * | 12/2023 | Carbone | B60T 8/1766 |
| 2024/0051506 | A1 * | 2/2024 | Nam | B60T 8/26 |
| 2024/0132034 | A1 * | 4/2024 | Xie | B60T 13/746 |
| 2024/0132036 | A1 * | 4/2024 | Xie | B60T 13/741 |
| 2024/0140385 | A1 * | 5/2024 | Xie | B60T 8/88 |
| 2024/0166177 | A1 * | 5/2024 | Saotome | B60T 8/171 |

FOREIGN PATENT DOCUMENTS

| | | | | |
|---|---|---|---|---|
| DE | 19543583 | C1 | 2/1997 | |
| DE | 102011120614 | A1 | 6/2013 | |
| DE | 102017204157 | A1 | 9/2018 | |
| DE | 102017211955 | A1 | 1/2019 | |
| DE | 102018133189 | A1 | 6/2020 | |
| DE | 102018133218 | A1 | 6/2020 | |
| DE | 102018133233 | A1 | 6/2020 | |
| DE | 102018222313 | A1 | 6/2020 | |
| DE | 102020202477 | A1 | 8/2021 | |
| WO | WO-2015032637 | A1 * | 3/2015 | B60T 8/4081 |

OTHER PUBLICATIONS

Office Action issued on Dec. 12, 2023, in corresponding Chinese Application No. 202210328680.4, 16 pages.

European Search Report issued on Jul. 13, 2022 in corresponding European Patent Application No. 22155029.6; 14 pages. (with machine translation).

Office Action issued on Jun. 29, 2024, in corresponding Chinese Application No. 202210328680.4, 14 pages.

German Search Report issued on Dec. 10, 2021 in corresponding German Patent Application No. 10 2021 108 524.1 (8 pages with machine translation).

* cited by examiner

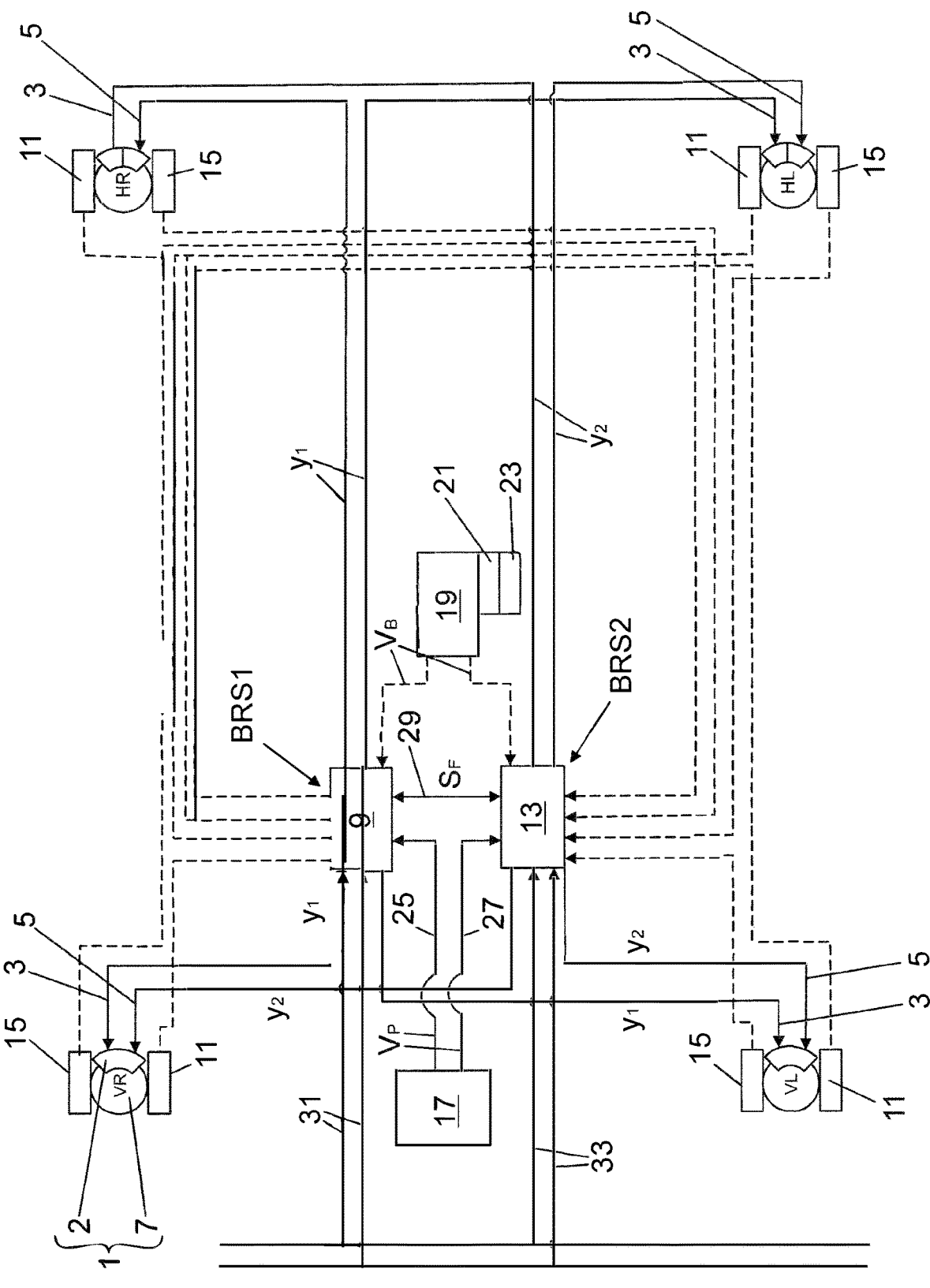

BRAKING SYSTEM FOR AN AUTONOMOUS VEHICLE

FIELD

The invention relates to a braking system in an at least partially autonomous vehicle.

BACKGROUND

In an at least partially autonomous vehicle, the braking system has to be designed for autonomous brake pressure buildup and for autonomous driver assistance regulation (for example, ABS or ESP functions). Depending on the design of the system, the braking system has to perform both braking and also steering tasks in case of error and bring the vehicle safely to a standstill automatically and keep it at a standstill. For this purpose, the braking system is equipped with a primary brake regulation system and a redundant secondary brake regulation system.

In a generic braking system, the primary brake regulation system has a primary control unit and one electromechanical primary actuator per vehicle wheel for actuating the vehicle wheel brake. The primary control unit generates a primary positioning signal to activate the respective electromechanical primary actuator on the basis of a setpoint deceleration specification generated in a pilot system (for example a driver assistance system) and/or a setpoint deceleration specification generated on the part of the vehicle by means of a brake pedal.

In the prior art, the secondary brake regulation system is equipped with a reduced functionality in comparison to the primary brake regulation system. Therefore, in case of error in the braking system, the use of highly automated driving functions is only enabled during, for example, driving conditions which are not very demanding with respect to lateral dynamics. The use on freeway sections is thus possible. However, restrictions are given by the curve radius of freeways, which has to be as large as possible, or by good roadway conditions. Functions with respect to the maximum speed are also restricted. The maximum speed of automated driving of level 3 or 4 is 130 km/h during normal operation. In contrast, the maximum speed is presently limited to 80 km/h during use of the secondary braking regulation system. Moreover, in current vehicles, the parking brake function is integrated into the transmission structure of the vehicle in a manner using simple components.

A braking system having an auxiliary module is known from DE 10 2017 211 955 A1. A drivetrain having a hydrodynamic retarder is known from DE 10 2011 120 614 A1. A brake pressure control unit for a road vehicle is known from DE 195 43 583 C1.

SUMMARY

The object of the invention is to provide a braking system in an at least partially autonomous vehicle, the secondary brake regulation system of which has increased functionality in comparison to the prior art.

The invention is directed to a braking system in an at least partially autonomous, two-track vehicle having front axle and rear axle. The braking system has one vehicle wheel brake per vehicle wheel, which is assigned to both a primary brake regulation system and also a redundant secondary brake regulation system. The primary brake regulation system is constructed from a primary control unit and one electromechanical primary actuator per vehicle wheel for actuating the vehicle wheel brake. In normal driving operation, the primary control unit generates a primary positioning signal on the basis of a setpoint deceleration specification, which is generated by a pilot system or is generated on the part of the driver by means of a brake pedal, with the aid of the primary positioning signal, the respective electromechanical primary actuator is activated.

To increase the functionality, the secondary brake regulation system has a secondary control unit independent of the primary control unit and one electromechanical secondary actuator, which is independent of the primary actuator, per vehicle wheel. The secondary control unit generates a secondary positioning signal on the basis of the setpoint deceleration specification, which is generated in the pilot system and/or is generated on the part of the driver by means of the brake pedal, using which the respective electromechanical secondary actuator is activated.

The brake system according to the invention thus manages using a dry system topology entirely without brake fluid. The implementation of a brake force is carried out via electromechanical actuators operating free of hydraulics on the wheel brake. The input signal of a braking intention on the part of the driver can be ascertained by means of a foot pedal simulator unit. The redundant sensors integrated in the foot pedal simulator unit convert the mechanical movement of the brake pedal into an electrical signal. The signal is sent to the primary control unit and to the secondary control unit via simple wiring. The two control units can be supplied with electrical energy via a redundant vehicle electrical system and a double embodiment of the wiring. Each control unit can also receive the wheel speeds from each wheel via redundant speed sensors and via a double signal line. Furthermore, the two control units can be connected to a redundant bus system via a bus line embodied in double form in each case. Moreover, a redundant bus line (referred to in general hereinafter as a connecting signal line) can be provided for information transmission between the two control units.

The activation of the electromechanical primary and secondary actuators at the wheels is carried out by means of the control units. One control unit takes over the activation of a total of four actuators in each case here.

Each of these actuators is integrated on a different brake caliper. The actuators are simple positioning elements, which are activated via a working current that is switched via the control unit. No components for processing items of information or working currents are integrated in the actuators.

A higher-performance fallback level in comparison to the prior art is achieved by the invention due to the construction of a dry braking system. The networking of the system components of the primary brake regulation system and the secondary brake regulation system enables lateral stabilization of the vehicle even in case of error. The improved dynamics overall enable a higher deceleration in case of error. Dispensing with a parking brake installed in a gearshift transmission of the vehicle is also enabled.

According to the invention, the dry system concept uses a twofold integration of components to secure the secondary brake regulation system. The functions of the system components are embodied twice. If one component fails, a second component is present which takes over the function. All system components can also be in use during normal operation. In one embodiment variant, none of the components can be redundant and can only be in function in case of error.

As soon as the driver steps on the foot pedal simulator, an electrical signal is generated and relayed to the two control units, which process this signal. The driver is accordingly entirely mechanically decoupled from the braking system. The two control units activate the electromechanical actuators at the wheel brakes, which generate the brake force. Due to the networking, a wheel-individual brake force can be generated at all four wheels by means of a control unit. Going askew due to an uneven buildup of the brake force, which can occur due to different processing times of the control units, can be precluded. Four wheel brakes are always activated by one control unit here, whereby the latency times for building up a brake force are identical. The brake force regulation is ensured via driving the electric motor forward and backward.

The dry braking system according to the invention is based on a double embodiment of each system component. Upon failure of one component, a second component is present which can continue the same functions independently of a failure. The most critical failure of a system component is the failure of a control unit. In the event of such a failure, the functions of 50% of the electromechanical actuators are stopped, since they are not further activated by the failed control unit. Nonetheless, this means that the deceleration of the vehicle does not necessarily decrease by 50%. The limiting factor of a maximum deceleration of the vehicle is the coefficient of friction between tires and roadway. The primary braking system is designed so that locking of the wheels is always achieved during braking. The clamping force of the brake calipers is sufficiently high that theoretically a higher brake force could be achieved than can actually be transmitted to the roadway.

The clamping force of a single electromechanical actuator has to be designed so that the electromechanical actuator can independently enable the locking of the wheels.

The secondary brake regulation system according to the invention can still set the wheel-individual brake force. The functions of longitudinal and lateral stabilization of the vehicle remain secured, as is also the case in the event of an error in the primary brake regulation system. In comparison to the primary brake regulation system, the secondary brake regulation system overall has no restrictions and enables all functions which the primary brake regulation system can also achieve.

The holding function is achieved by means of a working current which acts on at least one electromechanical actuator per wheel. A brake force is thus built up and retained. Moreover, the system topology enables securing of the holding function in case of error, since one second electromechanical actuator per wheel can be activated in each case.

Different variations are possible with respect to the function of parking. The locking of the actuator is fundamentally ensured by the use of a blocking function in the electromechanical actuators and a force for parking can be maintained. To meet the requirement that in the event of an error in the primary brake regulation system, the parking force is transmitted to at least two wheels, at least four of the eight electromechanical actuators have to have a blocking function. One control unit has to be able to activate at least two actuators for the blocking function in each case here. The layout of which wheels this blocking function is integrated on is irrelevant here. However, the optimal structure of an integration of the blocking function is to integrate a blocking function on each wheel brake of the vehicle. The blocking functions of opposing wheel brakes are each activated by one control unit in this case. In this way, the prior art in vehicles having a driven axle is surpassed and the vehicle can park with four instead of two wheels in normal operation. The prior art in vehicles having all-wheel-drive and parking brake is not achieved, since the parking brake also acts on four wheels in these vehicles. In addition, in this prior art a force flow is achieved by means of form fit and friction lock.

In the critical case of error, i.e., a failure of a control unit, the option is still provided of being able to transmit the parking force via two wheels. The parking force acts in this case on one wheel of each of the front and rear axle. In addition, the parking force always acts on one right and one left wheel. The influence of the roadway conditions can be reduced in this way.

Essential aspects of the invention are described once again in detail hereinafter: The primary control unit and the secondary control unit can thus preferably be embodied to be structurally equivalent and functionally equivalent. In the same way, the primary actuators and the secondary actuators can also be implemented to be structurally equivalent and functionally equivalent.

The brake pedal can preferably be a component of a foot pedal simulator unit having at least one pedal sensor. The foot pedal simulator unit can convert the mechanical pedal movement into an electrical foot pedal signal, which is the setpoint deceleration specification generated on the part of the driver.

To further increase the system security, is preferred if a primary vehicle electrical system and a redundant secondary vehicle electrical system are provided. These can each supply the primary control unit and the secondary control unit with electrical energy independently of one another.

In one technical embodiment, a primary speed sensor and a secondary speed sensor can be assigned to each vehicle wheel. The primary speed sensor has a signal connection to the primary control unit. In the same way, the secondary speed sensor has a signal connection to the secondary control unit.

It is preferred if the pilot system has a signal connection via a primary signal line to the primary control unit. Independently thereof, the pilot system can have a signal connection via a further secondary signal line to the secondary control unit.

In a first embodiment variant, solely the primary brake regulation system can be in use in normal driving operation, while the secondary brake regulation system is deactivated. The primary control unit can preferably be connected via a connecting signal line to the secondary control unit. Items of status information can be exchanged between the two control units via the connecting signal line. If a case of error in the primary brake regulation system is diagnosed in the primary control unit, an error signal is generated, using which the secondary control unit is activatable via the connecting signal line. In this case, the secondary brake regulation system, in place of the primary brake regulation system, takes over the implementation of the setpoint deceleration specification.

In an alternative operating mode, both the primary brake regulation system and also the secondary brake regulation system can already be in use in normal driving operation. In this case, the two brake regulation systems therefore operate in parallel operation already in normal driving operation.

In one refinement of the invention, at least one of the electromechanical primary actuators and at least one of the electromechanical secondary actuators can each have a blocking function, by means of which, in a parking situation, the actuator blocks the assigned vehicle wheel by brake actuation. All actuators are preferably equipped with such a blocking function.

BRIEF DESCRIPTION OF THE FIGURE

An exemplary embodiment of the invention is described hereinafter on the basis of the appended FIGURE.

DETAILED DESCRIPTION

A schematic block circuit diagram of the braking system of a two-track autonomous vehicle having a front axle and a rear axle is shown in the FIGURE. Accordingly one vehicle wheel brake 1 is assigned to each of the two front wheels VL, VR and each of the two rear wheels HR, HL. The vehicle wheel brake 1 has a brake caliper 2, to which pressure can be applied via an electromechanical primary actuator 3 and via an electromechanical secondary actuator 5, whereby the brake caliper 2 comes into pressure contact using its brake linings (not shown) with the brake disk 7 of the vehicle wheel brake 1. The electromechanical primary actuator 3 is a component of a primary brake regulation system BRS1, while the electromechanical secondary actuator 5 is a component of a secondary brake regulation system BRS2. All actuators 3, 5 operate free of hydraulics.

The primary brake regulation system BRS1 is constructed in the FIGURE from a primary control unit 9 and the total of four electromechanical primary actuators 3, which are each assigned to one vehicle wheel brake 1. Moreover, the primary control unit 9 has one signal connection to a primary speed sensor 11 per vehicle wheel VL, VR, HR, HL.

The redundant secondary brake regulation system BRS2 has structurally equivalent components to the primary brake regulation system BRS1. Accordingly, the secondary brake regulation system BRS2 is constructed from one secondary control unit 13 and one electromechanical secondary actuator 5 per vehicle wheel. The secondary control unit 13 moreover has a signal connection to secondary speed sensors 15, which are provided on each vehicle wheel.

In normal driving operation, primary positioning signals $y_1$ are generated in the primary control unit 9 on the basis of a setpoint deceleration specification $V_P$ generated in a pilot system 17 (for example a driver assistance system having ABS and EPS functions) and/or a setpoint deceleration specification $V_B$ generated on the part of the driver by means of a brake pedal 19. With the aid of the primary positioning signals $y_1$, the respective electromechanical primary actuators 3 are activated to perform diverse braking or steering tasks.

The primary control unit 9 and the secondary control unit 13 are each supplied with electrical energy independently of one another by a primary vehicle electrical system 31 and a redundant secondary vehicle electrical system 33.

In the FIGURE, the brake pedal 19 is a foot pedal simulator unit having a pressure sensor 21 and a distance sensor 23. The foot pedal simulator unit converts the pedal movement detected by the two sensors 21, 23 into an electrical foot pedal signal which corresponds to the setpoint deceleration specification $V_B$ generated on the part of the driver.

In the FIGURE, the pilot system 17 moreover has a signal connection to the primary control unit 9 using a primary signal line 25, while the pilot system 17 has a signal connection to the secondary control unit 13 via a secondary signal line 27 independently thereof. In addition, the two control units 9, 13 are connected to one another by means of a connecting signal line 29. Items of status information can be exchanged between the two control units 9, 13 via the connecting signal line 29.

In normal driving operation, only the primary brake regulation system BRS1 is used in the illustrated embodiment variant, while the redundant secondary brake regulation system BRS2 is deactivated. If a diagnostic module in the primary control unit 9 detects a case of error in the primary brake regulation system BRS1, an error signal $S_F$ is generated, which is read out by the primary control unit 9 via the connecting signal line 29 in the secondary control unit 13. The secondary brake regulation system BRS2 thereupon takes over the implementation of the setpoint deceleration specifications $V_P$, $V_B$.

Alternatively thereto, both the primary brake regulation system BRS1 and also the secondary brake regulation system BRS2 can already be in use in normal driving operation, so that both brake regulation systems operate in parallel operation.

In addition, the electromechanical primary and secondary actuators 9, 13 each have a blocking function, by means of which the respective actuator 3, 5 blocks the assigned vehicle wheel by brake actuation in a parking situation.

LIST OF REFERENCE SIGNS 1 vehicle wheel brake
2 brake caliper
3, 5 primary and secondary actuators
7 brake disk
9 primary control unit
11 primary speed sensor
12 hydraulic circuit
13 secondary control unit
15 secondary speed sensors
17 pilot system
19 brake pedal
21 pressure sensor
23 distance sensor
25 primary signal line
27 secondary signal line
29 connecting signal line
31 primary vehicle electrical system
33 secondary vehicle electrical system
$S_F$ error signal
$V_P$, $V_B$ setpoint deceleration specifications
$y_1$, $y_2$ positioning signals
BRS1 primary brake regulation system
BRS2 secondary brake regulation system

The invention claimed is:

1. A braking system in an at least partially autonomous vehicle, comprising:
   one vehicle wheel brake per vehicle wheel, which is assigned to both a primary brake regulation system and a secondary brake regulation system,
   wherein the primary brake regulation system has
   a primary control unit and
   one electromechanical primary actuator per vehicle wheel for actuating the vehicle wheel brake, the primary control unit is configured to generate primary positioning signals for activating the respective electromechanical primary actuator on the basis of a setpoint deceleration specification generated in a pilot system and/or a setpoint deceleration specification generated on the part of the driver by a brake pedal, wherein the secondary brake regulation system has a secondary control unit independent of the primary control unit and one electromechanical secondary actuator, independent of the primary actuator, per vehicle wheel, the secondary control unit is configured to generate secondary positioning signals for activating the respective electromechanical secondary actuator on the basis of the setpoint deceleration specification generated in the pilot system, each electromechanical primary actuator and each electromechanical secondary actuator has a blocking function, by which, in a parking situation, each respective actuator is configured to block an assigned vehicle wheel by brake actuation, the pilot system has a signal connection to the primary control unit via a primary bus, the pilot system has a signal connection to the secondary control unit via a secondary bus independent of the primary bus, and a tertiary bus connecting the primary control unit and the secondary control unit is configured to exchange status information between the primary control unit and the secondary control unit.

2. The braking system as claimed in claim 1, wherein the brake pedal is a component of a foot pedal simulator unit having at least one pedal sensor, and the foot pedal simulator unit is configured to convert the mechanical pedal movement into an electrical foot pedal signal, which is the setpoint deceleration specification generated on the part of the driver.

3. The braking system as claimed in claim 1, further comprising:

a primary vehicle electrical system and a redundant secondary vehicle electrical system, which each supply the primary control unit and the secondary control unit with electrical energy independently of one another.

4. The braking system as claimed in claim 1, wherein each vehicle wheel is assigned a primary speed sensor and a secondary speed sensor.

5. The braking system as claimed in claim 1, wherein in case of error in the primary brake regulation system, the primary control unit generates an error signal, using which the secondary control unit is activatable via the tertiary bus, so that in place of the primary brake regulation system, the secondary brake regulation system takes over the implementation of the setpoint deceleration specification.

6. The braking system as claimed in claim 1, wherein in normal driving operation, both the primary brake regulation system and the secondary brake regulation system are in use, so that both brake regulation systems operate in parallel operation.

7. The braking system as claimed in claim 1, wherein the primary control unit and the secondary control unit are structurally equivalent, and/or the primary actuator and the secondary actuator are structurally equivalent.

8. The braking system as claimed in claim 2, further comprising:

a primary vehicle electrical system; and a redundant secondary vehicle electrical system, which each supply the primary control unit and the secondary control unit with electrical energy independently of one another.

9. The braking system as claimed in claim 2, wherein each vehicle wheel is assigned a primary speed sensor and a secondary speed sensor.

10. The braking system as claimed in claim 3, wherein each vehicle wheel is assigned a primary speed sensor and a secondary speed sensor.

11. The braking system as claimed in claim 2, wherein in case of error in the primary brake regulation system, the primary control unit generates an error signal, using which the secondary control unit is activatable via the tertiary bus, so that in place of the primary brake regulation system, the secondary brake regulation system takes over the implementation of the setpoint deceleration specification.

12. The braking system as claimed in claim 3, wherein in case of error in the primary brake regulation system, the primary control unit generates an error signal, using which the secondary control unit is activatable via the tertiary bus, so that in place of the primary brake regulation system, the secondary brake regulation system takes over the implementation of the setpoint deceleration specification.

13. The braking system as claimed in claim 4, wherein in case of error in the primary brake regulation system, the primary control unit generates an error signal, using which the secondary control unit is activatable via the tertiary bus, so that in place of the primary brake regulation system, the secondary brake regulation system takes over the implementation of the setpoint deceleration specification.

14. The braking system as claimed in claim 2, wherein in normal driving operation, both the primary brake regulation system and the secondary brake regulation system are in use, so that both brake regulation systems operate in parallel operation.

* * * * *